US006826292B1

(12) United States Patent
Tao et al.

(10) Patent No.: US 6,826,292 B1
(45) Date of Patent: Nov. 30, 2004

(54) METHOD AND APPARATUS FOR TRACKING MOVING OBJECTS IN A SEQUENCE OF TWO-DIMENSIONAL IMAGES USING A DYNAMIC LAYERED REPRESENTATION

(75) Inventors: Hai Tao, Lawrenceville, NJ (US); Rakesh Kumar, Monmouth Junction, NJ (US); Harpreet Singh Sawhney, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 586 days.

(21) Appl. No.: 09/603,666

(22) Filed: Jun. 23, 2000

(51) Int. Cl.[7] .................................................. G06K 3/00
(52) U.S. Cl. ...................................... 382/103; 382/293
(58) Field of Search ................................. 382/103, 107, 382/108, 276, 293, 305, 236, 173, 206, 232; 345/16, 3.2, 721, 719, 328, 432, 427, 430; 348/155, 335, 584, 700; 375/240.16

(56) References Cited

U.S. PATENT DOCUMENTS

| | | | | |
|---|---|---|---|---|
| 5,103,305 A | * | 4/1992 | Watanabe | 382/236 |
| 5,168,530 A | * | 12/1992 | Peregrim et al. | 382/199 |
| 5,323,470 A | * | 6/1994 | Kara et al. | 382/103 |
| 5,436,672 A | * | 7/1995 | Medioni et al. | 348/591 |
| 5,481,669 A | * | 1/1996 | Poulton et al. | 345/505 |
| 5,502,804 A | * | 3/1996 | Butterfield et al. | 715/502 |
| 5,511,153 A | | 4/1996 | Azarbayejani et al. | |
| 5,557,684 A | | 9/1996 | Wang et al. | |
| 5,563,988 A | | 10/1996 | Maes et al. | |
| 5,627,905 A | * | 5/1997 | Sebok et al. | 382/107 |
| 5,629,988 A | * | 5/1997 | Burt et al. | 382/276 |
| 5,657,402 A | * | 8/1997 | Bender et al. | 382/284 |
| 5,686,960 A | * | 11/1997 | Sussman et al. | 348/218.1 |
| 5,764,803 A | * | 6/1998 | Jacquin et al. | 382/236 |
| 5,768,447 A | | 6/1998 | Irani et al. | |
| 5,802,220 A | | 9/1998 | Black et al. | |
| 6,035,067 A | * | 3/2000 | Ponticos | 382/226 |
| 6,049,619 A | * | 4/2000 | Anandan et al. | 382/107 |
| 6,205,260 B1 | * | 3/2001 | Crinon et al. | 382/284 |

OTHER PUBLICATIONS

Black, Michael J. and Yacoob, Yaser, "Tracking and Recognizing Rigid and Non–Rigid Facial Motions using Local Parametric Models of Image Motion", Proc. Fifth Int. Conf. on Computer Vision, Boston, Jun. 1995.

Cox, Ingemar J. and Hingorani, Sunita L., "An Efficient Implementation of Reid's Multiple Hypothesis Tracking Algorithm and Its Evaluation for the Purpose of Visual Tracking", IEEE Transactions on Pattern Analysis and Machine Intelligence, vol. 18, No. 2, pp. 138–50, Feb. 1996.

Hager, Gregory D. and Belhumeur, Peter N., "Real–Time Tracking of Image Regions with Changes in Geometry and Illumination", Proc. of the IEEE Conf. on Computer Vision and Pattern Recognition, 1996.

* cited by examiner

*Primary Examiner*—Yon J. Couso
(74) *Attorney, Agent, or Firm*—William J. Burke, Esq.

(57) ABSTRACT

A system that tracks one or more moving objects in a sequence of video images employs a dynamic layer representation to represent the objects that are being tracked. The system concurrently estimates three components of the dynamic layer representation—layer segmentation, motion, and appearance—over time in a maximum a posteriori (MAP) framework. In order to enforce a global shape constraint and to maintain the layer segmentation over time, the subject invention imposes a prior constraint on parametric segmentation. In addition, the system uses a generalized Expectation-Maximization (EM) algorithm to compute an optimal solution. The system uses an object state that consists of representations of motion, appearance and ownership masks. The system applies a constant appearance model across multiple images in the video stream.

24 Claims, 4 Drawing Sheets

METHOD AND APPARATUS FOR TRACKING MOVING OBJECTS IN A SEQUENCE OF TWO-DIMENSIONAL IMAGES USING A DYNAMIC LAYERED REPRESENTATION

This application claims the benefit of the filing date of the Provisional application entitled "DYNAMIC LAYER REPRESENTATION WITH APPLICATIONS TO TRACKING" filed Jun. 12, 2000, the contents of which are incorporated herein by reference.

This invention was made with government support under contract number, DAAB07-98-C-J023 awarded by the Department of the Army. The government has rights in this invention.

BACKGROUND OF THE INVENTION

The present invention concerns a system and method for tracking moving objects in a sequence of video images and in particular, a system that represents the moving objects in terms of layers and uses the layered representation to track the objects.

Many methods have been proposed to accurately track moving objects in a sequence of two-dimensional images. Most of these methods can track moving objects only when the motion conforms to predefined conditions. For example, change-based trackers ignore any information concerning the appearance of the object in the image and thus have difficulty dealing with moving objects that overlap or come close to overlapping in the sequence of images. Template-based image tracking systems such as that disclosed in the article by G. Hager et al. entitled "Real-time tracking of image regions with changes in geometry and illumination," Proceedings. of the IEEE Conference on Computer Vision and Pattern Recognition, pp. 403-410, 1996, typically update only motion. The templates used by these systems can drift off or become attached to other objects of similar appearance. Some template trackers, such as that disclosed in the article by M. J. Black et al. entitled "Tracking and recognizing rigid and non-rigid facial motions using local parametric models of image motion," Proceedings of the. Fifth International Conference on Computer Vision, ICCV'95, p.p. 374-381 1995 use parametric motion (affine/similarity etc.) to update both the motion and the shape of the template. Because, however, there is no explicit updating of template ownership, drift may still occur. A Multiple-hypothesis tracking method disclosed, for example in an article by I. J. Cox et al. entitled "An efficient implementation of Reid's multiple hypothesis tracking algorithm and its evaluation for the purpose of visual tracking," EEE Transactions on Pattern Analysis and Machine Intelligence, vol. 18, no. 2, pp. 138–150, February 1996, solves some of these problems but only when the image sequence is processed off-line in a batch mode. In addition, the computational complexity of these algorithms limits their state representations to contain only motion information.

SUMMARY OF THE INVENTION

The present invention is embodied in a system that tracks one or more moving objects in a sequence of video images. The tracking system employs a dynamic layer representation to represent the objects that are being tracked. This tracking system incrementally estimates the layers in the sequence of video images.

According to one aspect of the invention, the system concurrently estimates three components of the dynamic layer representation—layer segmentation, motion, and appearance—over time in a maximum a posteriori (MAP) framework. In order to enforce a global shape constraint and to maintain the layer segmentation over time, the subject invention imposes a prior constraint on parametric segmentation. In addition, the system uses a generalized Expectation-Maximization (EM) algorithm to compute an optimal solution.

According to one aspect of the invention, the system uses an object state that consists of representations of motion, appearance and ownership masks. With an object state represented as a layer, maximum a posteriori (MAP) estimation in a temporally incremental mode is applied to update the object state for tracking.

According to another aspect of the invention, the system applies a constant appearance model across multiple images in the video stream.

According another aspect of the invention, the system employs a parametric representation of the layer ownership.

BRIEF DESCRIPTION OF THE DRAWINGS

The invention is best understood from the following detailed description when read in connection with the accompanying drawings. Included in the drawings are the following figures.

DETAILED DESCRIPTION

In the last ten years, the layered representation of multiple moving objects in a sequence of images and the algorithms associated with layered representations have emerged as powerful tools for motion analysis. A layered representation represents each object in the image that represents independent motion as a respective layer. When the layered representation is both compact and comprehensive, these algorithms are able to precisely segment and estimate the motion of multiple independent 2D components in dynamic scenes. Compared to the model-based methods, described above, the layered representation is data-driven and imposes weaker prior constraints on segmentation, motion, and appearance of objects.

The key idea behind layer estimation is to simultaneously estimate the object motion and segmentation based on motion consistency. Prior methods focused on formulating various constraints on the motion of the layers and their segmentation. The constraints on motion reflect the image formation conditions and the dynamic behavior of scenes. The constraints on segmentation, on the other hand, encode the knowledge of the scene geometry.

Segmentation constraints usually appear in the form of prior constraints on the layered representations. Only local smoothness models such as the first order Markov random fields (MRF) have been extensively investigated. The assumption behind these models is that pixels spatially close to each other tend to be in the same layer. This is obviously insufficient to encode global shape constraints such as layers in a scene having prior segmentation constraints for a round or square shape.

The traditional layer methods are limited to processing two-frames at a time or to processing frames in a multi-frame batch formulation. When more than two images are used, additional constraints are available across the images. In the context of tracking, multi-frame constraints are imposed as temporal constraints. A prior motion constraint states that the motion in each frame should satisfy a dynamic model, e.g. a constant velocity model. A prior constraint on segmentation, on the other hand, may interact with the temporal constraints by constraining the dynamics of the shape change across images.

The present invention is embodied in an image tracking system that represents moving objects in terms of layers. In order to track and maintain identity of objects over time, the state of a moving object consists of representations of motion, appearance and the segmentation prior constraint masks. Tracking with this relatively complete state representation is important for applications that benefit from segmented object appearance (for example, indexing and object insertion/removal). For applications concerning only positions and geometric transformations, this state representation produces more robust results than most existing trackers that use only partial state representations. Because a sequence of video images is used, constraints for the layer appearance are imposed. In particular, a constant appearance model is applied to each object. In the exemplary embodiment, constraints of segmentation, motion and appearance are applied.

With the above constraints, the problem of estimating layer representation over time is equivalent to optimizing the expression (1)

$$P(\text{motion}_t, \text{appearance}_t, \text{segmentation\_prior}_t | \text{image}_t, \text{image}_{t-1}, \text{motion}_{t-1}, \text{appearance}_{t-1}, \text{segmentation\_prior}_{t-1}) \quad (1)$$

In this application, quantities in the current image are identified by a subscript t. The quantities in the previous image are identified by the subscript t−1. Expression 1, represents the probability that the motion, appearance and segmentation prior constraint of the current image conform to the predicted motion, appearance and segmentation prior constraints of the previous image(s). The expression (1) is optimized obtained by applying the EM algorithm with the actual segmentation as the hidden variable. The details of each constraint used in our algorithms are presented below.

One advantage of the subject invention is that it applies multi-object tracking as a 2D layer estimation and tracking in order to achieve completeness of representation. Consequently, the subject invention may be used to track moving objects in streaming images. This dynamic estimation and updating of layers contrasts with the two-frame/multi-frame batch formulations used in the prior art.

Compact representation of layer ownership is an important aspect of this representation. Prior art systems that assign an ownership layer to an object use a bit-map representation. This representation, however, does not enforce a global shape constraint and cannot be updated efficiently within a MAP framework. Accordingly, the subject invention employs a parametric representation of the layer ownership. This parametric representation allows for efficient tracking of rigid objects having compact shapes.

The subject invention concurrently estimates the motion and segmentation of an object based on some measure of motion consistency. The bulk of the previous works focus on formulating various constraints on layer motion and layer segmentation. The constraints on motion reflect the image formation conditions and the dynamic behaviors of scenes. The constraints on segmentation, on the other hand, encode the knowledge of the scene geometry.

The various constraints may be classified into three categories. In addition to the motion constraints and segmentation constraints, the present invention adds one more category called appearance constraints. These impose constraints on the appearance of each layer. Each category of constraints is further divided into three types: local spatial constraints, global spatial constraints, and multi-frame temporal constraints.

In the prior art, most motion constraints are global in nature, being modeled as affine motion or projective motion. Local motion constraints have also been proposed. The present invention, however, models each motion group as a linear combination of local basis flow fields.

The motivation for employing a global parametric shape prior constraint is twofold. Firstly, this constraint prevents a segment from evolving into arbitrary shapes in the course of tracking. As a result, it assists in tracking when the measurements are ambiguous or cluttered. Secondly, only the compact parametric form is updated in the state over time. This makes the estimation process computationally tractable. The layer segmentation prior constraint is application-dependent. It encodes the knowledge regarding the geometry of the objects. It is emphasized that, because the segmentation constraints are only prior constraints, they do not need to encode the exact shape of the tracked objects.

The exemplary system is described in terms of an aerial video surveillance (AVS) system that tracks vehicles in video sequences taken from an airplane or helicopter. It is contemplated, however that the tracking system has general application and may be applied to other tasks that benefit from the tracking of moving objects such as machine vision in a factory environment, or object tracking for image insertion/deletion in video editing.

In airborne video, the dominant image region is the ground. Its motion can be modeled as projective plane (layer 0). Vehicles moving on the ground are the foreground layers (layer 1 to g−1). Their shapes are usually rectangular so their prior shape constraint can be conveniently modeled as a local elliptical Gaussian distribution. An exemplary distribution along one axis of the ellipse is shown in FIG. 1.

Figure 1:
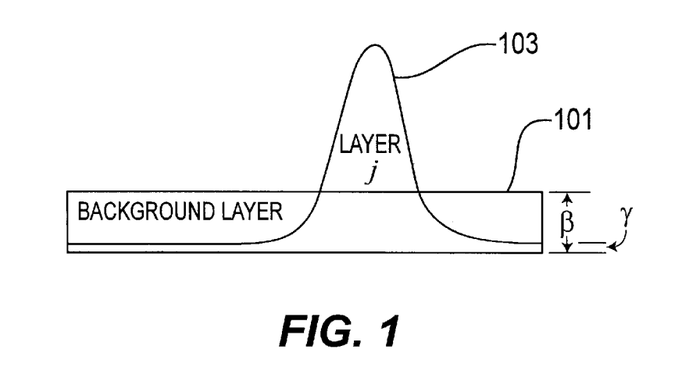
FIG. 1 is a graph showing probability distributions of the foreground and background that is useful for describing the segmentation prior constraint used by the subject invention.

As shown in FIG. 1, at each instant of time, the prior constraint 101 of the background layer has a constant value, $\beta$, for every pixel. This constrains every pixel in the image as belonging to the background layer by default. The prior constraint 103 for each foreground layer j is given by the expression (2)

$$\gamma + \exp[-(x_1 - \mu_{t,j})^T \Sigma_{t,j}^{-1} (x_1 - \mu_{t,j})/2] \quad (2)$$

where $\mu_{t,j}$ is the center of the distribution and $\Sigma_{t,j}$ is the covariance matrix that defines the span of the distribution.

One of the consequences of this model is that pixels with large distances from any foreground layer center have higher probability of belonging to the background layer than to any foreground layer. This prior constraint is combined with the image likelihood to produce the final segmentation. The term γ represents a small positive value that prevents the foreground prior constraint from going to zero. This term allows pixels to belong to a foreground layer—even if they are relatively far away from the layer center—as long as they have relatively high likelihood values. Therefore, γ represents the uncertainty of the layer shape. This uncertainty is included in the prior constraint because the shapes of vehicles are not exactly elliptical and may change significantly over time.

In summary, the prior constraint for a pixel $x_i$ belonging to layer j is defined by equation (3).

$$L_{t,j}(x_i) = \begin{cases} \gamma + \exp\left[-(x_i - \mu_{t,j})^T \Sigma_{t,j}^{-1} (x_i - \mu_{t,j})/2\right] & j = 1, \ldots, g-1 \\ \beta & j = 0 \end{cases} \quad (3)$$

The normalized prior segmentation constraint is defined by equation (4).

$$S_{t,j}(x_i) = L_{t,j}(x_i) \Big/ \sum_{j=0}^{g-1} L_{t,j}(x_i) \quad (4)$$

The covariance matrix $\Sigma_{t,j}$ is defined by equation (5).

$$\Sigma_{t,j} = R^T(-\omega_{t,j}) \text{Diag}[1/l_{t,j}^2, 1/s_{t,j}^2] R(-\omega_{t,j}) \quad (5)$$

where $l_{t,j}$ and $s_{t,j}$ are proportional to the lengths of the major and the minor axes of the iso-probability contours of the elliptical distribution and thus describe the shape of each foreground layer. The translation $\mu_{t,j}$ and the rotation angle $\omega_{t,j}$ are motion parameters. $\Phi_{t,j} = [l_{t,j}, s_{t,j}]$ denotes the shape prior constraint parameter of layer j in the current image. The dynamic model for the shape prior constraint is a constant shape model defined by equation (6).

$$P(\Phi_{t,j}|\Phi_{t-1,j}) = N(\Phi_{t,j}; \Phi_{t-1,j}, \text{diag}[\sigma_{ls}^2, \sigma_{ls}^2]) \quad (6)$$

where $N(x: \eta, \Sigma)$ is a Gaussian distribution.

In addition to the segmentation prior constraints, the present invention uses motion prior constraints and appearance prior constraints to create a layered representation of moving objects in a scene. In an aerial video tracking application, the background motion is modeled as a projective planar motion. With the background motion compensated, the motion of the foreground layer j is approximated using a translation $\mu_{t,j}$ and rotation $\omega_{t,j}$. The motion parameter vector is $\Theta_{t,j} = [\mu_{t,j}^T, \omega_{t,j}]^T$, where $\mu_{t,j}$ is the translation velocity and At j is the rotation velocity. The constant 2D velocity model used by the present invention is represented by equations (7) and (8).

$$P(\Theta_{t,j}|\Theta_{t-1,j}) = N(\Theta_{t,j}; \Theta_{t-1,j}, \text{diag}[\sigma_\mu^2, \sigma_\mu^2, \sigma_\omega^2]) \quad (7)$$

and $$\mu_{t,j} = \mu_{t-1,j} + \dot{\mu}_{t,j}, \quad \omega_{t,j} = \omega_{t-1,j} + \dot{\omega}_{t,j}. \quad (8)$$

In equation (7), the diagonal matrix has three terms because the translation velocity, $\mu_{t,j}$, is a two-dimensional vector representing motion in both the horizontal and vertical directions.

The appearance image of layer j is denoted by $A_{t,j}$. A local coordinate system is defined by the center and the axes of the Gaussian segmentation prior constraint. The coordinate transform of a pixel $x_1$ from the original image to a pixel, $T_j(x_i)$, in the local coordinate system is represented by equation (9)

$$T_j(x_i) = R(-\omega_j)(x_i - \mu_j). \quad (9)$$

This transform is determined by the motion parameters of layer j. For any pixel $x_i$ in the original image, the observation model for layer j is defined by equation (10)

$$P(I_t(x_i)|A_{t,j}(T_j(x_i))) = N(I_t(x_i): A_{t,j}(T_j(x_i)), \sigma_1^2) \quad (10).$$

A constant appearance model assumes that, for any pixel $T_j(x_i)$ in the appearance image, the probability that the appearance of the pixel in image t matches the appearance in image t−1 is defined by equation (11)

$$P(A_{t,j}(T_j(x_i))|A_{t-1,j}(T_j(x_i))) = N(A_{t,j}(T_j(x_i)): A_{t-1,j}(T_j(x_i)), \sigma_A^2) \quad (11)$$

As set forth above, the present invention optimizes the layered representation of each moving object in order to track the objects in the sequence of moving images. The optimization method used is the Expectation-Maximization (EM) algorithm. To describe this algorithm, the function $\Lambda_t = (\Phi_t, \Theta_t, A_t)$ denotes the layer representation at each instant of time, where $\Phi_t$ is the segmentation prior constraint, $\Theta_t$ is the motion prior constraint, and $A_t$ is the appearance prior constraint. The goal is to find the $\Lambda_t$ that maximizes the a posteriori probability, as represented by equation (12)

$$\max_{\Lambda_t} \arg P(\Lambda_t|I_t, \Lambda_{t-1}, I_{t-1}) \quad (12)$$

$$= \max_{\Lambda_t} \arg P(I_t|\Lambda_t, \Lambda_{t-1}, I_{t-1}) P(\Lambda_t|\Lambda_{t-1}, I_{t-1})$$

The EM algorithm can solve this MAP problem by explicitly computing layer ownership (segmentation). The inventors have determined that a local optimal solution can be achieved by iteratively optimizing or improving the function Q, shown in equation (13) with respect to $\Lambda_t$.

$$Q = E[\log P(I_t, z_t|\Lambda_t, \Lambda_{t-1}, I_{t-1})|I_t, \Lambda'_t, \Lambda_{t-1}, I_{t-1}] + \log P(\Lambda_{t-1}, I_{t-1}) \quad (13)$$

In equation (13), $z_1$ is a hidden variable that indicates to which layer each pixel belongs and $\Lambda'_t$ is the result of the previous iteration. The inventors have further determined that the optimization of equation (13) is equivalent to iteratively optimizing or improving the function represented by the expression (14)

$$\sum_{i=0}^{n-1} \sum_{j=0}^{g-1} h_{i,j} \{\log S_{t,j}(x_i) + \log P(I_t(x_i)|A_{t,j}(T_j(x_i)))\} + \quad (14)$$

$$\sum_{j=1}^{g-1} \{\log N(\Phi_{t,j}: \Phi_{t-1,j}, diag[\sigma_{ls}^2, \sigma_{ls}^2]) +$$

$$\log N(\Theta_{t,j}: \Theta_{t-1,j}, diag[\sigma_\mu^2, \sigma_\mu^2, \sigma_\omega^2]) +$$

$$\sum_{i=0}^{n-1} \log(N(A_{t,j}(T_j(x_i)): A_{t-1,j}(T_j(x_i)), \sigma_A^I))\}$$

In expression (14) $h_{i,j}$ is the layer ownership—the posterior probability of pixel $x_i$ belonging to layer j conditioned on $\Lambda'_t$. It is noted that the shape constraint is employed only as a prior constraint. This is different from the use of the shape constraints in many model-based tracking algorithms, where the shape constraint defines the actual segmentation.

Because it is difficult to optimize the terms $\Phi_t$, $\Theta_t$ and $A_t$ simultaneously in the expression (14), the present invention uses the strategy of improving one of the terms while holding the other two fixed. This is the generalized EM algorithm and it can be proved that this also converges to a local optimal solution.

Figure 2:
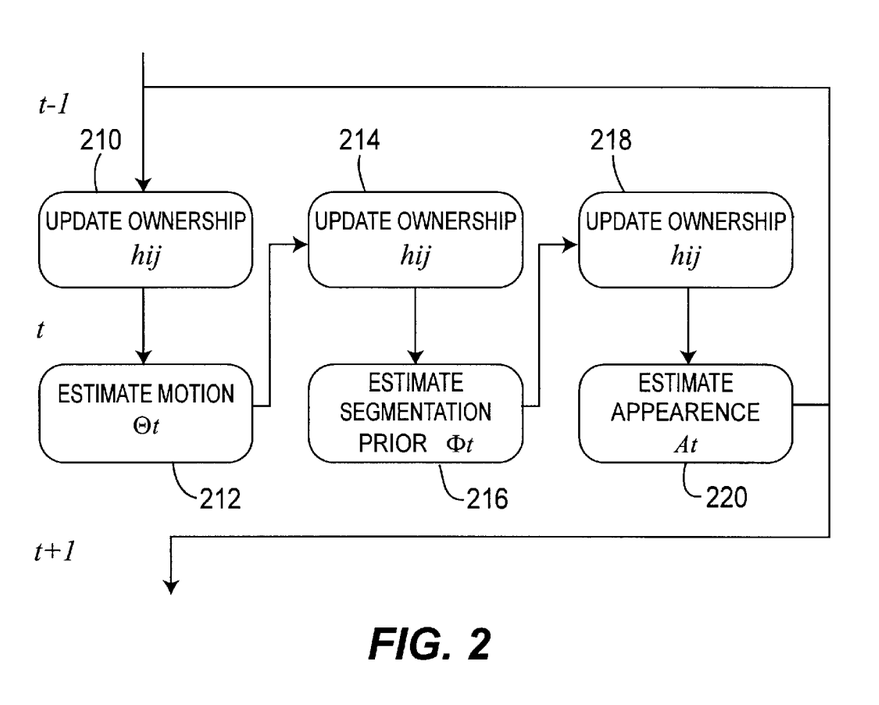
FIG. 2 is a flow-chart diagram that is useful for describing an optimization process used by an embodiment of the present invention.

FIG. 2 is a flow-chart diagram that is useful for describing the optimization process. As shown in FIG. 2, the process begins at step 210 by updating the ownership of each layer in the image. Next, at step 212, motion parameters of the layers are computed. After new motion parameters are available, the ownership of the layers is again updated at step 214. Next, at step 216, the algorithm updates the estimate of the segmentation prior constraint for each of the layers. After step 216, the ownership of each layer is updated at step 218. Finally, at step 220, the appearance of each layer is re-estimated. Although only a single iteration is shown in FIG. 2, it is contemplated that multiple iterations may be executed on a given image t before proceeding to the next image, t+1. Exemplary methods used to update the layer ownership and the segmentation, motion and appearance constraints are described below.

The layer ownership $h_{i,j}$ may be computed as shown in equation (15)

$$h_{i,j} = P(z_t(x_i) = j | I_t, \Lambda_t', \Lambda_{t-1}, I_{t-1}) \qquad (15)$$

$$= P(I_{t-1}(x_i) | A'_{t,j}(T_j(x_i))) S_{t,j}(x_i) / Z$$

The first two terms can be computed according to equations (10) and (4). In equation (15), the factor Z normalizes $h_{i,j}$ so that $$\sum_{j=0}^{g-1} h_{i,j} = 1.$$

If, as described above with reference to FIG. 2, the segmentation prior constraints and the appearance prior constraints are held constant, the motion estimation step 212 finds a value of the motion parameter vector $\Theta_t$ that improves expression (16)

$$\sum_{j=1}^{g-1} \log N(\Theta_{t,j} : \Theta_{t-1,j}, diag[\sigma_\mu^2, \sigma_\mu^2, \sigma_\omega^2]) + \qquad (16)$$

$$\sum_{i=1}^{n} \sum_{j=0}^{g-1} h_{i,j} \{ \log S_{t,j}(x_i) + \log P(I_t(x_i) | A_{t,j}(T_j(x_i))) \}$$

The motions of individual foreground layers are then estimated sequentially according to expression (17)

$$\min_{\Theta_{t,j}} \arg |\mu_{t,j} - \mu_{t-1,j}|/\sigma_\mu^2 + |\omega_{t,j} - \omega_{t-1,j}|/\sigma_\omega^2 - \qquad (17)$$

$$\sum_{i=0}^{n-1} 2h_{i,j} \log S_{t,j}(x_i) + \sum_{i=0}^{n-1} h_{i,j} (I_t(x_i) - A_{t,j}(T_j(x_i)))^2/\sigma_I^2$$

The first term in this expression is the motion prior constraint. The second term is the correlation between the layer ownership and the log function of the segmentation prior constraint. The third term is the weighted sum of squared differences between the image and the appearance of layer j as modified by the motion parameter vector $\Theta_{t,j}$. The solution is obtained by searching in the translation and the rotation space for an optimal value.

For the background layer, the motion can be approximated using, for example, the methods described in an article by J. Bergen et al. entitled "Hierarchical Model-Based Motion Estimation," Proceedings of the 2nd European Conference on Computer Vision, pp. 237–252, 1992.

The segmentation prior constraint parameter $\Phi_t$ is estimated at step 216 as shown in equation (18)

$$\min_{\Phi_t} \arg f = \qquad (18)$$

$$\sum_{j=0}^{g-1} \log N(\Phi_{t,j} : \Phi_{t-1,j}, diag[\sigma_{ls}^2, \sigma_{ls}^2]) + \sum_{i=0}^{n-1} \sum_{j=0}^{g-1} h_{i,j} \log S_{t,j}(x_i)$$

A gradient descent method may be used to optimize this function as shown in equations (19) and (20).

$$\frac{\partial f}{\partial l_{t,j}} = \qquad (19)$$

$$\sum_{i=0}^{n-1} \frac{h_{i,j}(D(x_i) - L_{t,j}(x_i))}{L_{t,j}(x_i) D(x_i)} (L_{t,j}(x_i) - \gamma) y_{i,j,x}^2 / l_{t,j}^3 - (l_{t,j} - l_{t-1,j})/\sigma_{ls}^2$$

$$\frac{\partial f}{\partial s_{t,j}} = \qquad (20)$$

$$\sum_{i=0}^{n-1} \frac{h_{i,j}(D(x_i) - L_{t,j}(x_i))}{L_{t,j}(x_i) D(x_i)} (L_{t,j}(x_i) - \gamma) y_{i,j,y}^2 / s_{t,j}^3 - (s_{t,j} - s_{t-1,j})/\sigma_{ls}^2$$

$$D(x_i) = \sum_{j=0}^{g-1} L_{t,j}(x_i)$$

The final step, 220, shown in FIG. 2 updates the appearance model of each layer with the velocity parameters $\Theta_t$ and the segmentation parameters $\Phi_t$ held fixed. In the exemplary embodiment of the invention, step 220 optimizes the expression (21).

$$\max_{A_{t,j}} \arg \sum_{i=0}^{n-1} \{ \log(N(A_{t,j}(T_j(x_i)) : A_{t-1,j}(T_j(x_i)), \sigma_A^2)) + \qquad (21)$$

$$h_{i,j} \log P(I_t(x_i) | A_{t,j}(T_j(x_i))) \}$$

The inventors have determined that the appearance parameters $A_{t,j}(T_j(x_i))$ may be calculated directly as shown in equation (22)

$$A_{t,j}(T_j(x_i)) = \frac{A_{t,j}(T_j(x_i))/\sigma_A^2 + h_{i,j} I_t(x_i)/\sigma_I^2}{(1/\sigma_A^2 + h_{i,j}/\sigma_I^2)} \qquad (22)$$

This equation represents the weighted average of the previous template and the current image.

Figure 3A:
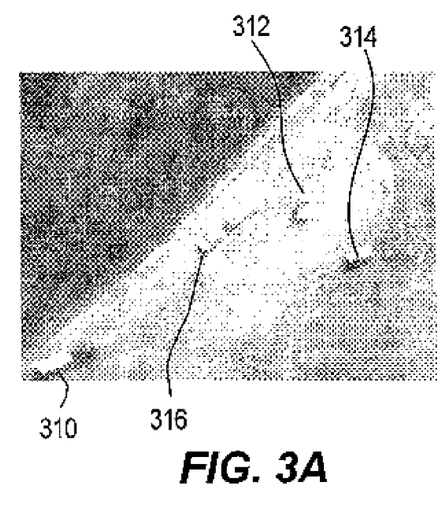
FIG. 3A is a photograph of a sample image that is useful for describing the operation of the present invention.

FIG. 3A shows a typical video frame from an aerial video surveillance (AVS) sequence. The exemplary video frames shown in FIGS. 3A, 4A, 5A and 6A are from a camera mounted on an airplane. The size of the video image is 320×240 pixels. The size of the vehicles ranges from 10×10 to 40×40 pixels.

Figure 3B:
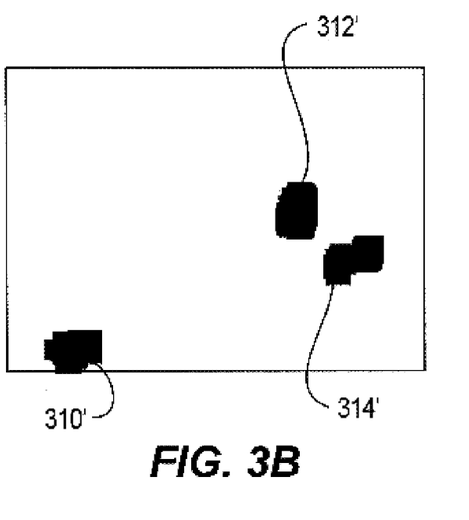
FIG. 3B is a blob diagram corresponding to the image shown in FIG. 3A.

The exemplary video image shown in FIG. 3A includes four vehicles, 310, 312, 314 and 316. FIG. 3B shows blob images of moving objects in the image from the AVS sequence represented by the image shown in FIG. 3A. In the exemplary embodiment of the invention, the blobs 310', 312' and 314' correspond to the vehicles 310, 312 and 314 shown in FIG. 3A. There is no blob in FIG. 3B corresponding to the vehicle 316 because that vehicle is not moving. The blob images shown in FIG. 3B are generated by estimating the dominant motion parameters of the background of the image using the method described in the above-referenced article by Bergen et al. Next, the image is analyzed to identify areas that exhibit motion which is inconsistent with the motion parameters of the background. These areas are the moving objects 310', 312' and 314'.

In addition to the core tracking algorithm described above with reference to FIG. 2, the exemplary tracking system also handles (1) the initialization of layers, (2) the deletion and addition of layers and (3) the determination of object status such as stopped and occluded. These tasks are important for practical applications of the object tracking system and are accomplished as described below with reference to FIG. 7.

Figure 7:
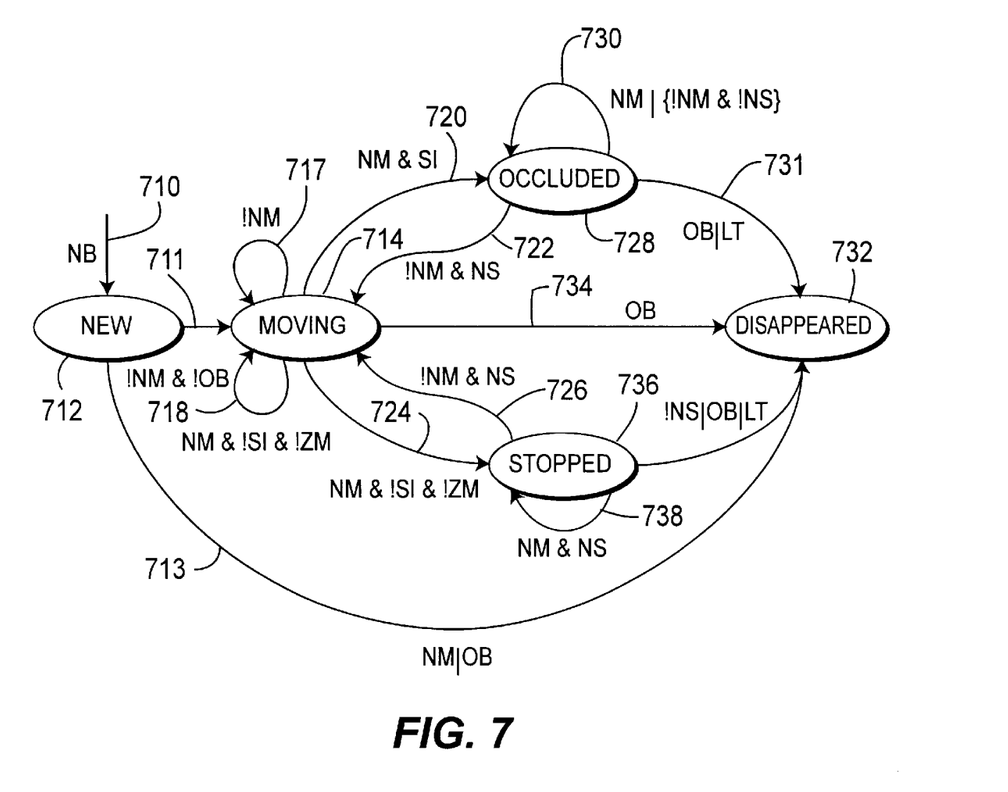
FIG. 7 is a state transition diagram that is useful for describing the operation of the present invention.

FIG. 7 is a state diagram of a state machine that maintains the status of the moving objects which are detected and tracked, as described above. The input signals to this state machine include the change blob images, as shown in FIG. 3B, and estimates of the current layer representation. The state machine shown in FIG. 7 has five states, NEW, MOVING, STOPPED, OCCLUDED and DISAPPEARED. Each directed edge represents a transition either from one state to another or within a single state. The condition governing the transition is marked along the edge. In FIG. 7, the character "|" indicates a logical OR operation, the character "&" indicates a logical AND operation and the character"!" indicates a logical NOT operation. The conditions used in FIG. 7 are explained in the following Table.

TABLE

| NS | normal SSD score |
|---|---|
| OB | out of bounds |
| NB | new blob |
| NM | no motion |
| LT | no motion for a long time |
| SI | significant increase in SSD score |
| ZM | zero motion estimation | where SSD is the sum of squares difference between the estimated appearance and the detected group of moving pixels corresponding to the layer.

For example, a new object is initialized if a new change blob is detected far away from existing objects. This is indicated in the state diagram by the edge 710 entering the state NEW 712. The condition NB next to this edge indicates that a new blob has been detected. State 712 is the state of a moving object for the first image in which it is detected.

An object is deleted if it is out of the field of view. Thus, if an object in state NEW 712 exhibits no motion (NM) or is recognized as being out of bounds (OB) when it is analyzed in the next frame in the sequence, its state changes to DISAPPEARED 732. This is indicated by the edge 713 having the condition NM |OB.

If the inverse of the condition NM |OB (i.e. !NM & !OB —motion and not out of bounds) obtains for an object having the state NEW, the state of the object changes from NEW 712 to MOVING 714 as indicated by the edge 711. The state of a layer remains MOVING 714 as long as the layer is detected as moving (!NM), as indicated by the edge 716; or the layer is not moving but does not exhibit a significant increase in its SSD score and does not have zero motion estimation (i.e. NM & !SI & !ZM) as indicated by the edge 718.

As indicated by the edge 720, the state of a layer changes from MOVING 714 to OCCLUDED 728 if there is no motion and a significant increase in the SSD score of the layer (NM & SI). The state of the layer changes from OCCLUDED 728 to MOVING 714, as indicated by the edge 722, if the layer exhibits motion and has a normal SSD score (!NM & NS). The state of a layer remains OCCLUDED 728 if it does not exhibit motion or it exhibits motion but does not have a normal SSD score. The state of a layer transitions from OCCLUDED 728 to DISAPPEARED 732, as indicated by the edge 731, if the object is out of bounds or if the layer exhibits zero motion for a long time (OB|LT).

As indicated by the edge 724, a layer transitions from the state MOVING 714 to the state STOPPED 736 if the layer is not moving, has not had a significant increase in its SSD score and exhibits zero estimated motion (NM & !SI & ZM). The layer transitions from the STOPPED state 736 to the MOVING state 714, as indicated by the edge 726, if the layer exhibits motion and has a normal SSD score (!NM & NS). The edge 738 indicates that the layer stays in the STOPPED state 736 as long as it exhibits no motion and a normal SSD score (NM & NS).

The state of a layer transitions from STOPPED 736 to DISAPPEARED 732, as indicated by the edge 740, if the stopped layer does not have a normal SSD score, is out of bounds, or has been stopped for a long time (!NS |OB |LT). Finally, the state of a layer changes from MOVING 714 to DISAPPEARED 732 if the layer moves out of bounds (OB), as shown by the edge 734.

When a new layer (vehicle) is added, an initialization step estimates the three components of the layer, $\Phi_t$, $\Theta_t$, and $A_t$, from the change blob and the image. More specifically, the position of the object is located at the center of the blob, a zero velocity is assigned, and the segmentation prior constraint is estimated from the second order moments of the blob. The appearance is obtained from the original image. As each new image is processed, the moving objects are compared to the moving, occluded or stopped layers in the previous image to determine if they match one of the layers. If they do, they are processed by the algorithm shown in FIG. 2 to update the ownership and track the layer in the new image.

Figure 8:
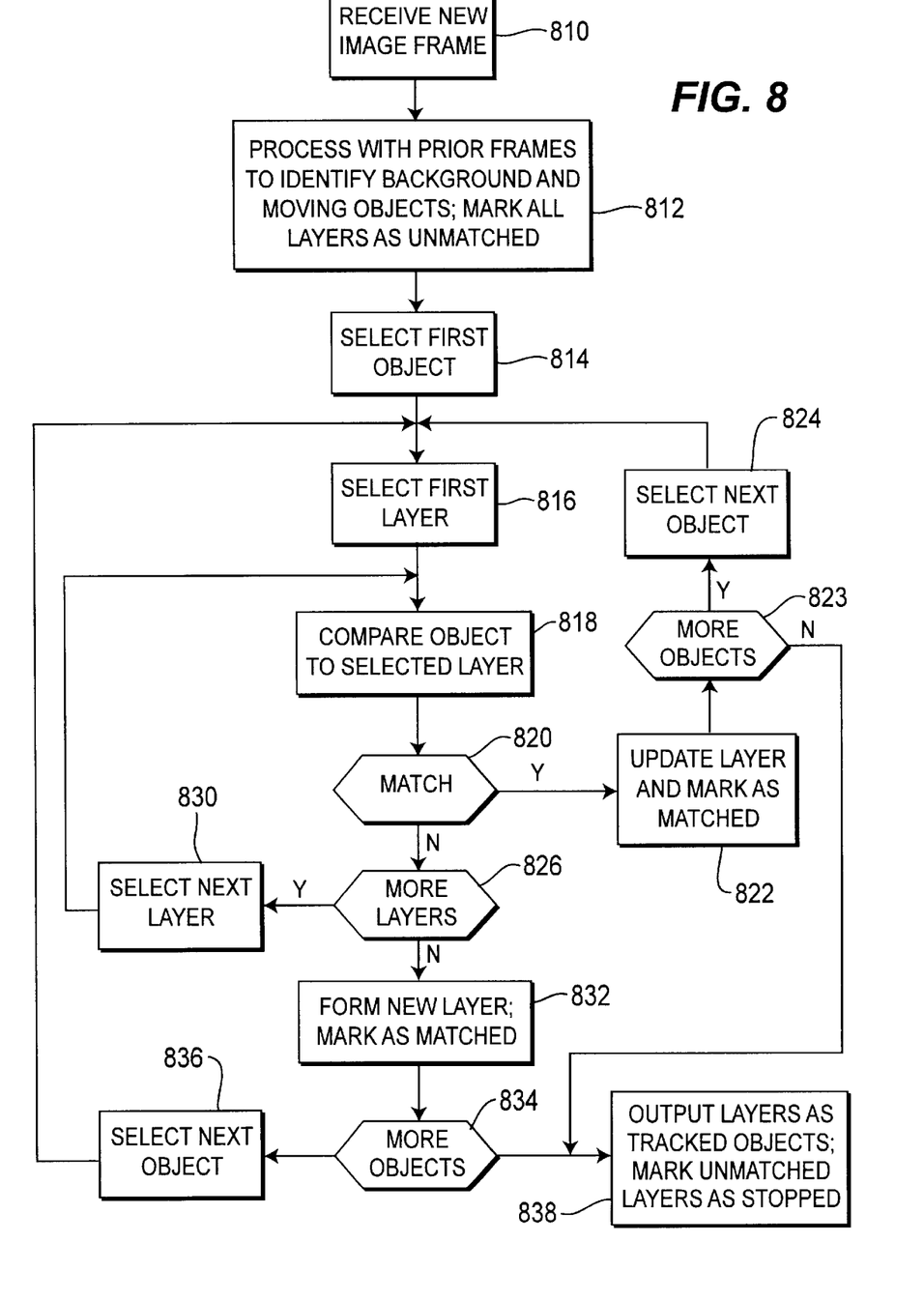
FIG. 8 is a flow-chart diagram that is useful for describing the operation of the present invention.

FIG. 8 is a flow-chart diagram that illustrates the overall operation of the invention. In the first step of this process, step 810, a new image frame is received. Next, at step 812, the process determines which pixels correspond to the background layer and which correspond to moving objects in the image, using the methods described in the above-referenced article by Bergen et al. At step 814, the process selects a first moving object from among the moving objects identified in step 812. At step 816, the process selects a first layer, that is to say, a first tracked object from among the objects currently being tracked by the process. Next, at step 818, the process compares the object to the layer to determine if the object corresponds to the layer. In making this comparison, the segmentation, velocity and appearance of the selected object are compared to the predicted segmentation, velocity and appearance of the selected layer, as described above. If, at step 820, a match is found between the selected object and the selected layer then, at step 822, the layer is removed from the list of unmatched layers and the selected layer is updated using information from the object. At step 823, the process determines if there are any more objects in the image that have not been matched to a layer. If so, a new object is selected at step 824, and control transfers to step 816, described above. If no more unmatched objects exist at step 823, control transfers to step 838, which marks the layers remaining in the list of available layers as STOPPED and provides information on the layers as tracked objects.

If, at step 820, no match was found for the current object, then control transfers to step 826 which determines if there are any more unmatched layers that have not been compared to this object. If so, step 830 selects the next layer and transfers control to step 818, described above. If, at step 826, the selected object does not match any of the layers, then it must represent a new layer. Accordingly, step 832 is executed which forms a new layer, as described above, and removes the new layer from the list of unmatched layers.

After step 832, step 834 is executed which determines if there are any objects that have not been matched to layers. If unmatched objects exist, control transfers to step 836 which selects the next object and transfers control to step 816, described above. If no unmatched objects exist then the process is complete and control transfers to step 838, described above, which provides data on the tracked objects.

The computational bottleneck in the real-time implementation of the proposed algorithm is the motion estimation step, which accounts for more than 95% of the computation. In the exemplary implementation shown in FIG. 9, the dominant background motion parameters are estimated at video rate using a moving object detection processor 910 which is a hardware implementation of the direct method described in the above-referenced article by Bergen et al. This information together with the video frames are then fed to a tracking system 912 which may be implemented on, for example, on an SGI Octane workstation, where the foreground motion is estimated using a multi-resolution template matching method. A low resolution change blob image is also computed on the workstation.

Figure 9:
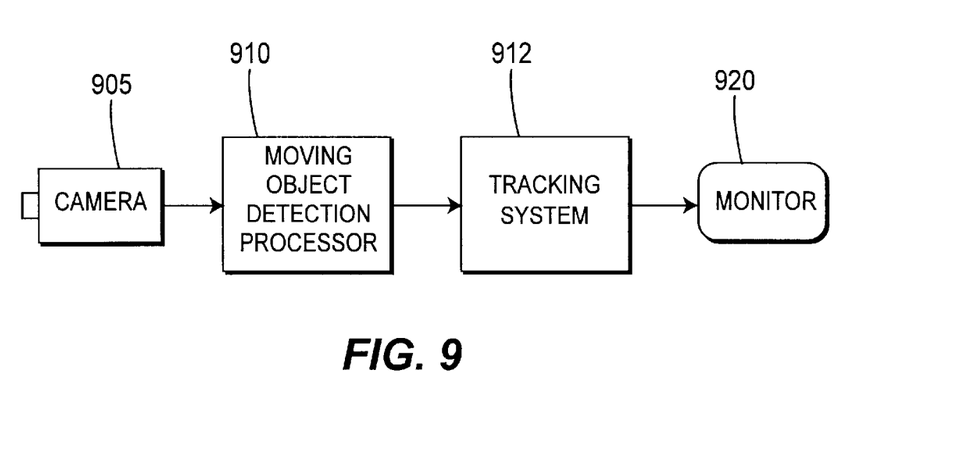
FIG. 9 is a block diagram of an exemplary processing system that may be used to implement the subject invention.

As set forth above, although multiple iterations of the EM algorithm may be performed in each frame, the inventors have determined that a single iteration is sufficient. Image frames are provided to the processor 910 from an imaging system 905 and information provided by the tracking system 912 is displayed on a monitor 920. The exemplary system can handle two moving objects at 10 Hz or four moving objects at 5 Hz.

Although the algorithm is described in terms of a real-time embodiment, it is contemplated that it may also operate in batch mode to analyze a sequence of pre-recorded images. It is also contemplated that the invention may be implemented using computer program software residing on a carrier such as a magnetic disk, an optical disk or a radio-frequency or audio-frequency carrier wave.

A tracking system is designed to handle complex motions and complex interactions such as passing and stopping. FIGS. 4A through 6C show the tracking results for a video sequence that includes a turning vehicle. In this example, the appearance, shape and motion of the vehicle change dramatically. The layer tracker, however, estimates them correctly and maintains the track.

Figure 4A:
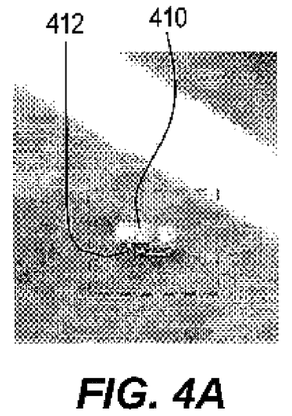
FIGS. 4A, 5A and 6A are photographs of an image sequence that includes a turning vehicle that are useful for describing the operation of the present invention.
Figure 4B:
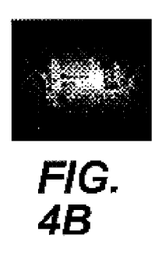
FIGS. 4B, 5B and 6B are diagrams showing the segmentation of the vehicles shown in FIGS. 4A, 5A and 6A, respectively.
Figure 4C:
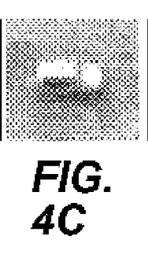
FIGS. 4C, 5C and 6C are diagrams showing the predicted appearance of the vehicles shown in FIGS. 4A, 5A and 6A, respectively.
Figure 5A:
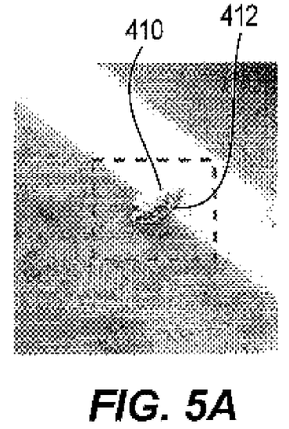
Figure 5B:
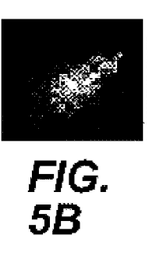
Figure 5C:
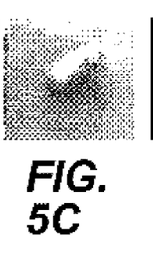
Figure 6A:
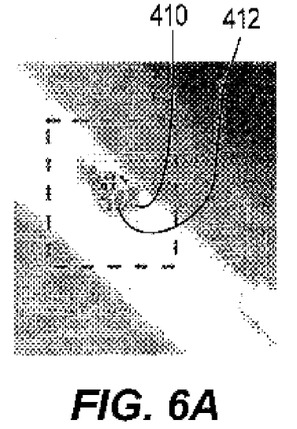
Figure 6B:
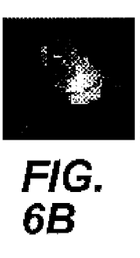
Figure 6C:
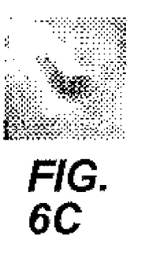

FIGS. 4A, 5A and 6A show cutouts original video frames that include a turning vehicle 410. Superimposed on the vehicle 410 are ellipses 412 representing the segmentation prior constraint. FIGS. 4B, 5B and 6B show the segmentation of the vehicle in each of the corresponding frames. FIGS. 4C, 5C and 6C show the appearance of the vehicle, warped to the image coordinates.

The tracking of vehicle interactions is difficult for prior art change-based trackers because separate blobs momentarily merge and motion is the only cue to distinguish the merged blobs after they split. While the velocity prior constraint may be used to distinguish separated blobs that have merged for a short period of time, this constraint is not reliable when the merge lasts for a long period of time. Prior art template-based trackers do not keep track of ownership and, so, may also lose track of merged vehicles, as they may erroneously transfer a template from one vehicle to the other while the vehicles are merged. A layer tracker according to the present invention, however, maintains the appearance information and reliably tracks vehicles that have merged and then separated in the image sequence.

One advantage of the proposed algorithm over many other trackers is that the background and the objects compete with each other in the layer estimation using motion cues. This improves the robustness of the tracker against the cluttered background and makes the tracking process more resilient to distraction from other close-by objects.

The difference between the Gaussian segmentation prior constraint from a Gaussian model in a model-based approach is that in the latter, the actual pixel-wise segmentation is not computed and if the shape of the object is not similar to an ellipse, it will erroneously use the background pixel for motion estimation. In the proposed method, the global shape constraint acts as a segmentation prior constraint and, thus, is a weaker constraint. The actual segmentation is still computed. Both the data-driven property of the layer approach and the efficiency of model-based approach are preserved.

Although the invention has been described in terms of exemplary embodiments, it is contemplated that it may be practiced as outlined above within the scope of the attached claims.

What is claimed:

1. Apparatus for tracking one or more moving objects in a sequence of video images comprising:

a moving object detection processor that identifies at least one area in a plurality of images selected from the sequence of video images, the at least one identified area representing moving objects; and a tracking system comprising:
   means forsegmenting the at least one identified area in the images;
   means for determining at least one respective motion parameter for the at least one identified area in the images; and
   means for determining a respective appearance for the at least one identified area in the images by image wariping of pixel in teh at least one identified area based on the at least one determined respective motion parameter.

2. Apparatus according to claim 1, wherein the tracking system further comprises means for calculating an ownership parameter for the at least one identified area in the images, the ownership parameter being a funtion of the segmentation, the motion parameter and the appearance.

3. Apparatus for tracking one or more moving objects in a sequence of video images comprising:

a moving object detection processor that identifies at least one area in a plurality of images selected from the sequence of video images, the at least one identified area representing moving objects; and a tracking system compirising:
   means for segmenting the at least one identified area in the images, including means for fitting an elliptical shape model to the identified area;
   means for determining at least one respective motion parameter for the at least one identified area in the images; and
   means for determining a respective appearance for the at least one identified area in the images.

4. Apparatus according to claim 3, wherein the elliptical shape model corresponds to the distribution:

$$\gamma+\exp[-(x_i-\mu_{t,j})^T\Sigma_{t,j}^{-1}(x_i-\mu_{t,j})/2]$$

where exp[q] represents the exponentiation operation $e^q$, $x_i$ is the position of the $i^{th}$ pixel in the image, $\mu_{t,j}$ is the position in the image of the center of the distribution, j is an index associated with the identified object, t is an index of one image of the images, y is a relatively small positive value and $\Sigma_{t,j}$ is the covariance matrix hat defines a span of the distribution and is represented by the equation:

$$\Sigma_{t,j}=R^T(-\omega_{t,j})\text{Diag}[1/l_{t,j}^2]R(-\omega_{t,j})$$

where R is the rotation matrix, $l_{t,j}$ and $s_{t,j}$ are proportional to the lengths of the major and the minor axes of ios-probability contours of the elliptical distribution and $\omega_{t,j}$ is the rotation angle.

5. Apparatus according to claim 1, wherein the means for determining the at least one respective motion parameter Includes means for determining an estimated translation velocity and an estimated rotation velocity for the at least one Identified area.

6. Apparatus according to claim 1, wherein the means for determining the at least one respective appearance parameter determines a plurality of intensity measurements in the identified area.

7. Apparatus according to claim 1, wherein the tracking system includes means for maintaining a description of each moving object in the sequence of video images as a respective layer in a dynamic layer representation, each layer having a segmentation constraint, a motion constraint and an appearance constraint and the tracking system further includes means for associating the at least one identified area with at least-one respective layer by concurrently matching the segmentation of the identified area to the segmentation constraint, the at least one velocity parameter of the identified area to the velocity constraint and the at least one appearance parameter of the area to the appearance constraint.

8. Apparatus according to claim 7, wherein the means for maintaining the description of each moving object Includes means for concurrently estimating layer motion, segmentation and appearance over time using a maximum a posteriori (MAP) framework.

9. Apparatus according to claim 8, wherein the means for maintaining the description of each moving object further includes means for applying a generalized Expectation-Maximization (EM) algorithm to compute an optimal solution.

10. Apparatus according to claim 9, wherein the means for maintaining the description of each moving object further includes means for applying a constant appearance model across multiple images in the sequence of video images.

11. A method for tracking one or more moving objects in a sequence of video images comprising:
the step of identifying at least one area in a plurality of images selected from the sequence of video images, the at least one identified area representing moving objects; and
the step of tracking the at least one identified area comprising the steps of:
segmenting the at least one identified area In the images;
determining at least one respective motion parameter for the at least one identified area in the imnages; and
determining a respective appearance for the at least one identified area in the images by image warping of pixels in the at least one identified area based on the at least one determined resoective motion parameter.

12. A method according to claim 11, wherein the tracking step further comprises the act of calculating an ownership parameter for the at least one identified area in the images, the ownership parameter being a function of the segmentation, the at least one motion parameter and the appearance.

13. A method for tracking one or more moving objects in a sequence of video images comprising:
the step of identlfying at least one area in a plurality Of r mages selected from the sequence of video images, the at least one identified area representina moving objects; and
the step of tracking the at least one identified area comprising the steps of:
segmenting the at least one identified area in the images, ineludes includino the act of fitting an elliptical shape model to the identified area;
determining at least one respective motion parameter for the at least one identified area in the images; and
determining a respective appearance for the at least one identified area in the images.

14. A method according to claim 13, wherein the elliptical shape model corresponds to the distribution;

$$\gamma+\exp[-(x_i-\mu_{t,j})^T\Sigma_{t,j}^{-1}(x_i-\mu_{t,j})/2]$$

where exp[q] represents the exponentiation operation $e^q$, $x_i$ is the position of the $i^{th}$ pixel in the image, $\mu_{t,j}$ is the position In the image of the center of the distribution, j is an index associated with the identified object, t is an index of one Image of the images, y is a relatively small positive value and $\Sigma_{t,j}$ is the covariance matrix that defines a span of the distribution and is represented by the equation:

$$\Sigma_{t,j}=R^T(-\omega_{t,j})\text{Diag}[1/s_{t,j}^2]R(-\omega_{t,j})$$

where R is the rotation matrix, $l_{t,j}$ and $S_{t,j}$ are proportional to the lengths of the major and the minor axes of iso-probability contours of the elliptical distribution and $\omega_{t,j}$ is the rotation angle.

15. A method according to claim 11, wherein the step of determining the at least one respective motion parameter includes the acts of determining an estimated translation velocity and an estimated rotation velocity for the at least one identified area.

16. A method according to claim 11, wherein the step of determining the at least one respective appearance parameter includes the act of determining a plurality of intensity measurements in the identified area.

17. A method according to claim 11, further including the step of maintaining a description of each moving object in the sequence of video images as a respective layer in a dynamic layer representation, each layer having a segmentation constraint, a motion constraint and an appearance constraint, and the method further includes the step of associating the at least one identified area with at least one respective layer by concurrently matching the segmentation of the identified area to the segmentation constraint, the at least one velocity parameter of the identified area to the velocity constraint and the at least one appearance parameter of the area to the appearance constraint.

18. A method according to claim 17, wherein the step of maintaining the description of each moving object includes the act of concurrently estimating layer motion, segmentation and appearance over time using a maximum a posteriori (MAP) framework.

19. A method according to claim 18, wherein the step of maintaining the description of each moving object further Includes the act of applying a generalized Expectation-Maximization (EM) algorithm to compute an optimal solution.

20. A method according to claim 19, wherein the step of maintaining the description of each moving object further includes the act of applying a constant appearance model across multiple Images in the sequence of video images.

21. An article of manufacture comprising a carrier including computer software that causes a computer to perform a method for tracking one or more moving objects in a sequence of video images, the method comprising:

the step of identifying at least one area in a plurality of images selected from the sequence of video images, the at least one identified area representing moving objects; and the step of tracking the at least one identified area comprising the steps of:

segmenting the at least one identified area in the Images;

determining at least one respective motion parameter for the at least one identified area in the Images; and determining a respective appearance for the at least one Identified area in the images by imaae warping of pixels in the at least one identified area based on the at least one determined respective motion parameter.

22. An article of manufacture according to claim 21, wherein, as a part of the tracking step, the computer program causes the computer to perform the act of calculating an ownership parameter for the at least one identified area in the Images; the ownership parameter being a function of the segmentation, the at least one motion parameter and the appearance.

23. An article of manufacture Icomprising a carrier including comouter software that causes a computer to perform a method for tracking one or more moving objects in a sequence of video images, the method comprising;

the step of identifying at least one area in a pluralty of images select from the sequence of video images, the at least one identified area representing movina objects: and the step of tracking the at least one identified area cotnorisino the steps of:

segmenting the at least one identified area in the images, including the act of fitting an elliptical shape model to the identified areas determining at least one respective motion parameter for the at least one identified area in the images: and determnining a respective appearance for the atleast one identifled area in the images.

24. An article of manufacture according to claim 21, wherein the computer program further causes the computer to maintain a description of each moving object in the sequence of video images as a respective layer in a dynamic layer representation, each layer having a segmentation constraint, a motion constraint and an appearance constraint, and further causes the computer to associate the at least one identified area with at least one respective layer by concurrently matching the segmentation of the identified area to the segmentation constraint, the at least one velocity parameter of the identified area to the velocity constraint and the at least one appearance parameter of the area to the appearance constraint.

* * * * *